United States Patent
Yamashita

(10) Patent No.: US 6,387,157 B1
(45) Date of Patent: May 14, 2002

(54) MIXED GAS CONCENTRATION REGULATING METHOD AND CONCENTRATION REGULATING APPARATUS

(75) Inventor: Naohiko Yamashita, Hyogo-ken (JP)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 14 days.

(21) Appl. No.: 09/619,642

(22) Filed: Jul. 19, 2000

(30) Foreign Application Priority Data

Aug. 27, 1999 (JP) .......................... 11-241269

(51) Int. Cl.$^7$ ............................... B01D 53/22
(52) U.S. Cl. ..................... 95/45; 95/55; 96/7; 96/9
(58) Field of Search ................... 95/43, 45, 46, 95/47, 48, 49, 50, 51, 52, 53, 54, 55, 56; 96/7, 9, 11

(56) References Cited

U.S. PATENT DOCUMENTS

| | | | |
|---|---|---|---|
| 4,119,417 A | * | 10/1978 | Heki et al. ......................... 96/7 |
| 4,180,553 A | * | 12/1979 | Null et al. ....................... 95/55 |
| 4,654,047 A | * | 3/1987 | Hopkins et al. ................ 95/55 |
| 4,701,187 A | * | 10/1987 | Choe et al. ..................... 95/55 |
| 5,006,132 A | * | 4/1991 | DiMartino, Sr. et al. ........ 95/55 |
| 5,102,432 A | * | 4/1992 | Prasad ............................. 96/9 |
| 5,185,014 A | * | 2/1993 | Prasad ............................. 96/9 |
| 5,282,969 A | * | 2/1994 | Xu .................................. 95/45 |
| 5,344,480 A | * | 9/1994 | Schulte et al. ................... 96/7 |
| 5,482,539 A | * | 1/1996 | Callahan ......................... 95/45 |
| 5,632,803 A | * | 5/1997 | Stoner et al. ................... 95/53 |
| 6,168,649 B1 | * | 1/2001 | Jensvold et al. ................. 96/9 |
| 6,221,131 B1 | * | 4/2001 | Behling et al. ................ 95/55 |

FOREIGN PATENT DOCUMENTS

| | | |
|---|---|---|
| EP | 0 974 389 A2 | 1/2000 |
| FR | 2 731 163 | 9/1996 |

\* cited by examiner

*Primary Examiner*—Duane Smith
*Assistant Examiner*—Jason M. Greene
(74) *Attorney, Agent, or Firm*—Young & Thompson

(57) ABSTRACT

A mixed gas concentration regulating method and a concentration regulating apparatus, in which the maintenance of the recovery of an easily permeable gas and the restraint of the power expense are compatible. The mixed gas concentration regulating apparatus which includes a pressure raising line having boosters for raising the pressure of a mixed gas having two or more gases different in permeability, a line for leading out a part of the mixed gas from the pressure raising line, a gas separation section for separating the gas fed from the line to a permeate gas and a retentate gas by gas separation membranes, and a line for introducing the permeate gas into the pressure raising line, wherein the gas separation section includes plural stages the respective stages being connected with each other by a line for feeding a retentate gas of the preceding stage to a gas separation section of the succeeding stage and lines are provided for introducing permeate gases of the respective stages into the pressure raising line separately or after they are joined, and the pressure difference of the pressure raising line is utilized so that the pressure ratio on the feed side and permeation side is made larger as in the gas separation section of the latter stage side.

8 Claims, 5 Drawing Sheets

MIXED GAS CONCENTRATION REGULATING METHOD AND CONCENTRATION REGULATING APPARATUS

BACKGROUND OF THE INVENTION

The present invention relates to a concentration regulating method and a concentration regulating apparatus for carrying out the concentration regulation of a mixed gas by gas separation, and particularly to a useful technique of decreasing the concentration of a hardly permeable gas as in such a case that the concentration of a mixed gas consisting of nitrogen gas and hydrogen gas is regulated to produce a feed material for ammonia synthesis.

DESCRIPTION OF THE RELATED ART

A technique of carrying out the purification of a mixed gas by utilization of a gas separation membrane has been hitherto known, and the mechanism and principle thereof are as follows. By use of a gas separation membrane made of a material different in permeability to the respective components of a mixed gas as a feed material is used, namely, the mixed gas fed as it is pressurized is separated to a permeate gas which is permeated through the same gas separation membrane and a retentate gas which is retained on the feed side. At that time, a difference (a difference in partial pressure) between one (a gas partial pressure) obtained by multiplying the whole pressure of the feed side (the high pressure side) by the mole fraction of each gas component and the other (a gas partial pressure) obtained by multiplying the whole pressure of the permeation side (the low pressure side) by the mole fraction of the same gas component becomes a motive power of permeation, and the permeation of each gas component is caused at a ratio obtained by multiplying this difference in partial pressure by a permeability and a membrane area. In the gas separation, accordingly, an easily permeable gas higher in permeability and a hardly permeable gas lower in permeability are separated as they are concentrated on the permeation side and on the feed side (the retentate gas side), respectively.

In a case where the concentration regulation of a mixed gas is carried out by utilization of such a gas separation technique as mentioned above, on the other hand, the concentration of a hardly permeable gas can be decreased, for instance, by leading out a part of a mixed gas as a feed material and separating it to a permeate gas and a retentate gas by a gas separation membrane, and then introducing the permeate gas, in which an easily permeable gas has been concentrated, into the mixed gas again.

In such a concentration regulating method, the following characteristics are particularly taken into consideration.. Namely, the concentration of an easily permeable gas in a retentate gas is lower and the higher the recovery of the easily permeable gas is, the higher the efficiency of gas separation is, and this becomes an important factor in a case where a compensation to the loss of the easily permeable gas is higher. In a case where the concentration of the easily permeable gas in a permeate gas is extremely lower, although it is not so important, on the other hand, the hardly permeable gas become apt to be entrained in the permeate gas and this is disadvantageous because a power for the gas separation therefore increases. When the pressure ratio (the feed side/the permeation side) of a gas separation membrane is low, a power expense for the pressure raising becomes smaller, but an equipment expense will increase because the recovery of the easily permeable gas becomes lower or the membrane area must be increased for maintaining the same recovery.

A case where a mixed gas consisting of nitrogen gas and hydrogen gas is subjected to the concentration regulation by the aforementioned concentration regulating method to produce a feed material for the ammonia synthesis, will be concretely described on the basis of FIG. 4.

A mixed gas as a feed material is produced by another process, and it has, for example, a whole pressure of about 25 bar (absolute pressure, this unit will apply to the following), in which the mole ratio of nitrogen gas exceeds a mole ratio ($\frac{1}{3}$) suitable for ammonia synthesis, and hence the concentration of nitrogen gas must be decreased. Since it is required in an ammonia synthesis process that the feed pressure of a mixed gas is generally 60~200 bar, on the other hand, the pressure thereof is raised to the same pressure in turn by a first booster C11 and a second booster C12. In this example, the pressure raising is performed to 50 bar in the first stage and to 100 bar in the second stage.

After a gas partially led out of the outlet side line of the second booster C12 is separated to a permeate gas and a retentate gas in a gas separation section S0 having a gas separation membrane M0, the permeate gas is introduced into the inlet side line of the first booster C11 so as to be joined with the feed material mixed gas. At that time, the retentate gas, in which hardly permeable nitrogen gas has been concentrated, is discharged out of the system and removed from the mixed gas, and hence the concentration of the hardly permeable gas in the mixed gas can be decreased. Thus, a mixed gas having a desired mole ratio can be obtained.

However, if the area of a gas separation membrane is made larger and namely the number of membrane modules connected in parallel is increased in the aforementioned concentration regulating method, the recovery of hydrogen gas will become higher, but there is contrary a problem of increasing the equipment expense. If the pressure ratio is lowered in order to restrain the power expense of a booster in such a case as mentioned above, where the stage number of gas separation sections is one stage, the recovery of an easily permeable gas will lower, and hence it has been difficult to make compatible the maintenance of the recovery of an easily permeable gas and the restraint of the power expense. In the conventional method using one stage of the gas separation section, namely, there has been such a limitation as mentioned above.

SUMMARY OF THE INVENTION

It is therefore an object of the present invention to provide a mixed gas concentration regulating method and a concentration regulating apparatus, in which the maintenance of the recovery of an easily permeable gas and the restraint of the power expense are compatible.

The aforementioned purpose can be achieved by the present invention, as follows. Namely, the mixed gas concentration regulating method according to the present invention comprises feeding a mixed gas consisting of two or more gases different in permeability to a gas separation membrane to a line having a booster so that the pressure thereof is raised, leading out a part of the mixed gas from said pressure raising line and separating it to a permeate gas and a retentate gas by a gas separation membrane, and then introducing said permeate gas into said pressure raising line, thereby regulating the concentration of the mixed gas, and is characterized in that the gas led out of said pressure raising line is separated to a first permeate gas and a first retentate gas by a first gas separation membrane, and then the first retentate gas is separated to a second permeate gas and a second retentate gas by a second gas separation membrane, and said first permeate gas and said second permeate gas are introduced into the pressure raising line separately or after they are joined, and the pressure ratio (the feed side/the permeation side) on the feed side and permeation side in the second gas separation membrane is made larger than the pressure ratio (the feed side/the permeation side) on the feed side and permeation side in the first gas separation membrane.

In the aforementioned construction, it is preferable that said gas separation membrane is composed of three or more stages, where a retentate gas of the preceding stage is separated in turn by a gas separation membrane of the succeeding stage, and permeate gases in the respective stages are introduced into said pressure raising line separately or after they are joined, and that the pressure ratio (the feed side/the permeation side) on the feed side and permeation side is made larger as in the gas separation membrane of the latter stage side. In addition, the term "stage number" in the present invention is indicative of the number of connection units in a case where units (gas separation sections or gas separation membranes) for performing the gas separation, are connected in series, and each of the units may be a group of gas separation sections or membranes, in which the gas separation sections or membranes are connected in parallel.

Further, the mixed gas concentration regulating method according to the present invention comprises raising the pressure of a mixed gas consisting of two or more gases different in permeability to a gas separation membrane in turn by a first booster and a second booster, separating a gas partially led out of the outlet side line of said second booster to a first permeate gas and a first retentate gas by a first gas separation membrane, and then separating said first retentate gas to a second permeate gas and a second retentate gas by a second gas separation membrane, and introducing said first permeate gas into the inlet side line of said second booster and introducing said second permeate gas into the inlet side line of said first booster, and in which the pressure ratio (the feed side/the permeation side) on the feed side and permeation side in the second gas separation membrane is preferably made larger than the pressure ratio (the feed side/the permeation side) on the feed side and permeation side in the first gas separation membrane.

In the aforementioned construction, the mixed gas as a feed material consists of nitrogen gas and hydrogen gas, where the mole ratio thereof (nitrogen gas/hydrogen gas) preferably exceeds $1/3$.

On the other hand, the mixed gas concentration regulating apparatus according to the present invention comprises a pressure raising line having a booster for raising the pressure of a mixed gas consisting of two or more gases different in permeability to a gas separation membrane, a line for leading out a part of the mixed gas from said pressure raising line, a gas separation section for separating the gas fed from said line to a permeate gas and a retentate gas by a gas separation membrane, and a line for introducing said permeate gas into said pressure raising line, and is characterized in that said gas separation section is composed of plural stages, where respective stages are connected with each other by a line for feeding a retentate gas of the preceding stage to a gas separation membrane of the succeeding stage and a line is provided for introducing permeate gases of the respective stages into said pressure raising line separately or after they are joined, and another booster is provided or the pressure difference of said pressure raising line is utilized so that the pressure ratio (the fed side/the permeation side) on the feed side and permeation side is made larger as in the gas separation section of the latter stage side.

Moreover, the mixed gas concentration regulating apparatus according to the present invention preferably comprises a first booster and a second booster for raising the pressure of a mixed gas consisting of two or more gases different in permeability to a gas separation membrane in turn, a line for leading out a part of the mixed gas from the outlet side line of said second booster, a first gas separation section for separating the gas fed from said line to a first permeate gas and a second retentate gas by a first gas separation membrane, a line for feeding said first retentate gas to a second gas separation section, a second gas separation section for separating the gas fed from said line to a second permeate gas and a second retentate gas by a second gas separation membrane, a line for introducing said first permeate gas into the inlet side line of said second booster, and a line for introducing said second permeate gas to the inlet side line of said first booster.

A gas separation section is composed, in any case, of plural stages (in series) and the pressure ratio (the feed side/the permeation side) on the feed side and permeation side is made larger as in the gas separation section of the latter stage side, and hence the power expense can be more restrained as the recovery of an easily permeable gas is maintained. Namely, since the concentration of an easily permeable gas is higher as in the gas separation section of the former stage side, a large amount of the easily permeable gas can be recovered with a small pressure drop even at a relatively small pressure ratio and the power expense of the former stage side can be restrained. Furthermore, since the concentration of an easily permeable gas is lower as in the gas separation section of the latter stage side, the pressure ratio must be made larger, but the power expense does not become so larger because of a smaller amount of gas fed thereto, and the recovery of the easily permeable gas can be maintained by raising the pressure ratio. Accordingly, the maintenance of the recovery of an easily permeable gas and the restraint of the power expense become compatible (Please concretely see Table 1 and Table 2).

Two boosters for raising the pressure of a mixed gas as a feed material are used to give the pressure ratio, as mentioned above, and hence there is no need of providing another booster and the equipment expense can be more decreased.

A mixed gas as a feed material consists of nitrogen gas and hydrogen gas, and hence its separation carried out by a gas separation membrane becomes easy. Furthermore, hardly permeable nitrogen gas can be removed from a mixed gas, in which the mole ratio of nitrogen gas/hydrogen gas thereof exceeds $1/3$, and at the same time the pressure raising of the mixed gas can be carried out, and hence a mixed gas suitable as a feed material for ammonia synthesis can be properly produced.

DESCRIPTION OF THE PREFERRED EMBODIMENTS

Now referring to the accompanying drawings, preferred embodiments of the present invention will be described.

This embodiment is an example of carrying out, by use of such an apparatus shown in FIG. 1, the concentration regulation of a mixed gas consisting of nitrogen gas and hydrogen gas as main components, which is a feed material, so that the concentration of nitrogen gas is lowered, where it is intended to make compatible the maintenance of the recovery of hydrogen gas and the restraint of the power expense, with restraining the equipment expense of boosters due to the use of a booster for double purpose.

As mentioned above, a mixed gas as a feed material is one produced in another step, and it is, for example, one having a whole pressure of about 25 bar, in which the mole ratio of nitrogen gas exceeds ⅓. On the other hand, it is required that a product gas has a pressure meeting with an ammonia synthesis process.

A mixed gas of about 25 bar is therefore raised in pressure in turn to about 50 bar by a first booster C11 and to about 100 bar by a second booster C12. As the boosters, a centrifugal compressor is properly used and one capable of carrying out two-stage compression at a compression ratio of 2 will be preferable. In addition, a water-cooled cooler for temperature maintenance use is provided just after each of the boosters, but it is omitted in the drawings.

In this embodiment, it is intended to use a booster for double purpose as a booster for raising the pressure of a product gas and a booster for generating a pressure difference for gas separation. Thus, two-stage gas separation will be carried out in accordance with the following steps.

Namely, a gas partially led out of the outlet side line of said second booster C12 is fed to a first gas separation section S1 via a line L1 and separated to a first permeate gas and a first retentate gas by a first gas separation membrane M1 provided in the inside thereof. Then, the first retentate gas is fed to a second gas separation section S2 via a line L3 and separated to a second permeate gas and a second retentate gas by a second gas separation membrane M2 provided in the inside thereof. On the other hand, the first permeate gas is introduced into the inlet side line of the second booster C12 (midway of the first and second boosters C11 & C12) via a line L,Q and the second permeate gas is introduced into the inlet side line (the feed material feed line) of the first booster C11 via a line L,S so that they are joined with the feed material mixed gas.

Since the retentate gas, in which hardly permeable nitrogen gas has been concentrated, is discharged out of the system through a line L5 and removed from the mixed gas, at that time, the concentration of the hardly permeable gas in the mixed gas can be decreased, whereby a mixed gas having a desired mole ratio can be obtained. In addition, the pressure ratio (the feed side/the permeation side) on the feed side and permeation side in the second gas separation membrane M2 is generated by two boosters and the pressure ratio (the feed side/the permeation side) in the first gas separation membrane M1 is generated by one booster, and the pressure ratio of the former becomes therefore larger than that of the latter.

As the gas separation section having the gas separation membrane, there is properly used a membrane module, in which an element equipped with a gas separation membrane is incorporated in a pressure container, and which is constructed in such a structure that a flow passage from the feed side to the retention side (the outlet side) and a flow passage on the permeation side are isolated with the gas separation membrane. As for the type of a concrete membrane module, there can be adopted all of module types for use in the gas separation such as a hollow fiber type and a spiral type.

As the gas separation membrane, there will be used various membranes made of polyamide, polyimide, polyamideimide, polyester, polycarbonate, polysulfone, polyethersulfone, polyetherketone or blends thereof. As for the form of a gas separation membrane, there are exemplified a hollow fiber and flat membrane and there can be properly used a membrane having an asymmetric structure.

As these separation membranes, there can be used various kinds of membranes available in market. In addition, the materials of gas separation membranes in the respective stages may be the same or different in kind.

The aforementioned membrane materials are properly selectable depending on the kind of a mixed gas or a gas to be recovered, and in this embodiment, a gas separation membrane module for hydrogen, manufactured by MEDAL Co., can be properly used for the aforementioned mixed gas. An example of concretely carrying out the concentration regulation by use of this membrane module will be described, as compared with conventional methods. Although impurities such as methane, argon and moisture are contained in a practical feed gas, in addition, these components are disregarded for simplification of the discussion, where the concentrations of residual components other than the concentration of hydrogen gas will be dealt with as the concentration of nitrogen gas.

Assuming that the flow rate of the mixed gas fed from the line L1 was 10,000 Nm3/h, the purity of hydrogen gas was 75% (mol %), the membrane area of the first gas separation membrane M1 was made equal to 2 units of the 12 inch type module and the membrane area of the second gas separation membrane M2 was made equal to 4 units of the 12 inch type module, the gas separation was operated at the aforementioned set pressures. Thus, the data shown in Table 1 was obtained.

TABLE 1

|  | Unit | This embodiment | Convention method 1 |
|---|---|---|---|
| Membrane area of the first stage | Module number | 2 | 0 |
| Membrane area of the second stage | Module number | 4 | 4.43 |
| Flow rate of feed gas | Nm3/h | 10,000 | 9,875 |
| Concentration of hydrogen gas in feed gas | mol % | 75 | 75 |
| Pressure of hydrogen gas in feed gas | bar | 100 | 100 |
| Flow rate of first permeate gas | Nm3/h | 4,116 |  |
| Concentration of hydrogen gas in first permeate gas | mol % | 98.54 |  |
| Pressure of hydrogen gas in first permeate gas | bar | 50 |  |
| Flow rate of first retentate gas | Nm3/h | 5,884 |  |
| Concentration of hydrogen gas in first retentate gas | mol % | 58.53 |  |
| Flow rate of second permeate gas | Nm3/h | 3,257 | 7,248 |
| Concentration of hydrogen gas in second permeate gas | mol % | 93.15 | 96.53 |
| Pressure of hydrogen gas in second permeate gas | bar | 25 | 25 |
| Flow rate of second retentate gas | Nm3/h | 2,627 | 2,627 |
| Concentration of hydrogen gas in second retentate gas | mol % | 15.6 | 15.6 |
| Recovery of hydrogen gas | % | 94.54 | 94.47 |
| Loss of ammonia feed material | Nm3/h | 546 | 546 |
| Amount of nitrogen gas extracted | Nm3/h | 2,081 | 2,081 |
| Additional motive power | Lc | 15,884 | 19,750 |

The conventional method 1 was carried out by an apparatus shown in FIG. 4 and could be grasped as a special example where the area of the first gas separation membrane was 0 (zero), and hence it was expressed as in Table 1. In order to obtain the concentration and flow rate of hydrogen gas which are the same as in this embodiment, at that time, the area of the gas separation membrane became 4.43.

Comparing this embodiment with the conventional method 1, there is a need of increasing the membrane area from 4.43 to 6, but an additional motive power can be decreased in a large extent (about 20%). Figures in Table 1 were calculated, as follows, where a motive power for compressing a unit flow by the booster was expressed as Lc and it was assumed that the motive powers Lcs of the first booster C11 and the second booster C12, both having a compression ratio of 2, were the same.

At first, the conventional more simple method 1 would be calculated. When a feed material with a flow rate of 9,875 Nm3/h was raised in pressure in turn by the first booster C11 and the second booster C12, a required motive power became as follows.

9,875Lc×2=19,750Lc

Although there was, at that time, a need of recompressing a permeate gas from 25 bar to 100 bar, this was not regarded as an additional motive power because it could be conceived that a similar compression was originally needed as the feed material gas.

In a case of this embodiment, on the other hand, there was a need of raising the pressure of a feed material with a flow rate of 10,000 Nm3/h by the first booster C11 and the second booster C12, but a flow rate of 4,116 Nm3/h for the first permeate gas was satisfactorily raised in pressure only by the second booster C12, and hence a motive power became as follows.

4,116Lc+5,884Lc ×2=15,884

In this embodiment, namely, an additional motive power could be restrained to about 80%, with maintaining the recovery of hydrogen gas, as compared with the conventional method 1.

(1) Although there has been given, in the aforementioned embodiment, an example where it is intended to use a booster for double purpose as a booster for raising the pressure of a product gas and a booster for generating a pressure difference for the gas separation, it may be tried to improve the efficiency of concentration regulation by providing other two boosters, as shown in FIG. 2.

After a gas partially led out of the inlet side line of a first booster C11 is raised in pressure by another booster C20 separately provided, namely, it is fed to a first gas separation section S1 via a line L1 and separated to a first permeate gas and a first retentate gas by a first gas separation membrane M1 provided in the inside thereof. Then, the first retentate gas is fed to a second gas separation section S2 via a line L3 and separated to a second permeate gas and a second retentate gas by a second gas separation membrane M2 provided in the inside thereof. On the other hand, the first permeate gas is introduced into downstream of the delivery portion of the inlet side line of the first booster C11 via a line L2, and the second permeate gas is passed through a line L4 raised in pressure by a further booster C30 separately provided, and then joined to the line L2. As the booster C20 and the booster C30, in addition, a reciprocating compressor will be properly used because the compression ratio thereof is larger and 3.

Also in this aforementioned case, the pressure ratio (the feed side/the permeation side) on the feed side and permeation side in the second gas separation membrane M2 is generated by two boosters and the pressure ratio (the feed side/the permeation side) in the first gas separation membrane M1 is generated by one booster, and the pressure ratio of the former becomes therefore larger than that of the latter.

As for additional motive power and the likes, this example was also compared with the conventional method 2 (please see: FIG. 5), similarly to the aforementioned embodiment.

The obtained results are given in Table 2.

TABLE 2

| | Unit | Another embodiment 1 | Conventional method 2 |
|---|---|---|---|
| Membrane area of the first stage | Module number | 3 | 0 |
| Membrane area of the second stage | Module number | 2 | 2.82 |
| Flow rate of feed gas | Nm3/h | 10,000 | 9,782 |
| Concentration of hydrogen gas in feed gas | mol % | 73.32 | 73.32 |
| Pressure of hydrogen gas in feed gas | bar | 75 | 75 |
| Flow rate of first permeate gas | Nm3/h | 5,840 | |
| Concentration of hydrogen gas in first permeate gas | mol % | 98.44 | |
| Pressure of hydrogen gas in first permeate gas | bar | 25 | |
| Flow rate of first retentate gas | Nm3/h | 4,160 | |
| Concentration of hydrogen gas in first retentate gas | mol % | 38.05 | |
| Flow rate of second permeate gas | Nm3/h | 1,409 | 7,031 |
| Concentration of hydrogen gas in second permeate gas | mol % | 93.94 | 98.32 |
| Pressure of hydrogen gas in second permeate gas | bar | 6.33 | 6.33 |
| Flow rate of second retentate gas | Nm3/h | 2,751 | 2,751 |
| Concentration of hydrogen gas in second retentate gas | mol % | 9.42 | 9.42 |
| Recovery of hydrogen gas | % | 96.47 | 96.39 |
| Loss of ammonia feed material | Nm3/h | 346 | 346 |
| Amount of nitrogen gas extracted | Nm3/h | 2,405 | 2,405 |
| Additional motive power | Lc | 11,409 | 16,813 |

In another embodiment 1, there is a need of increasing the membrane area from 2.82 to 5, but an additional motive power can be restrained to about 68%, with maintaining the recovery of hydrogen gas, as compared with the conventional method 2.

(2) Although there has been given, in the aforementioned embodiment, an example where it is intended to use a booster for double purpose as a booster for raising the pressure of a product gas and a booster for generating a pressure difference for the gas separation, it may be constructed that one unit of another booster is provided as shown in FIG. 3.

Namely, a gas partially led out of the outlet side line of a first booster C11 is fed to a first gas separation section S1 via a line L1 and separated to a first permeate gas and a first retentate gas by a first gas separation membrane M1 provided in the inside thereof. Then, the first retentate gas is fed to a second gas separation section S2 via a line L3 and separated to a second permeate gas and a second retentate gas by a second gas separation membrane M2 provided in the inside thereof. On the other hand, the first permeate gas is introduced into the inlet side line of the first booster C11 via a line L2, and the second permeate gas is passed through a line L4 raised in pressure by a further booster C30 separately provided, and then joined to the line L2.

Also in this aforementioned case, the pressure ratio (the feed side/the permeation side) on the feed side and permeation side in the second gas separation membrane M2 is generated by two boosters and the pressure ratio (the feed side/the permeation side) in the first gas separation membrane M1 is generated by one booster, and the pressure ratio of the former becomes therefore larger than that of the latter.

(3) Although there has been given, in the aforementioned embodiment, a case where the concentration of a mixed gas consisting of nitrogen gas and hydrogen gas is regulated to produce a feed material for ammonia synthesis, the kinds of a mixed gas as a feed material and a hardly permeable gas to be removed are not limited thereto.

All of mixed gases are usable which consist of, for instance, one or more of hydrogen gas, helium gas and steam as an easily permeable gas and one or more of nitrogen gas, carbon monoxide gas, methane gas and argon gas as a hardly permeable gas.

(4) Although there has been given, in the aforementioned embodiment, an example where all amount of a permeate gas is recovered, a part thereof may be led out of the system as a by-product.

(5) Although there has been given, in the aforementioned embodiment, an example where a gas separation section is composed of two stages, it may be composed of three or more stages. In this case, three stages of boosters are satisfactorily provided and a permeate gas of each stage is introduced into the inlet side of each of these boosters, for instance, in an apparatus shown in FIG. 1. In addition, parts of the permeate gases of the respective stages may be introduced into anyone of the boosters after they are joined.

DESCRIPTION OF REFERENCE NUMERALS

Figure 1:
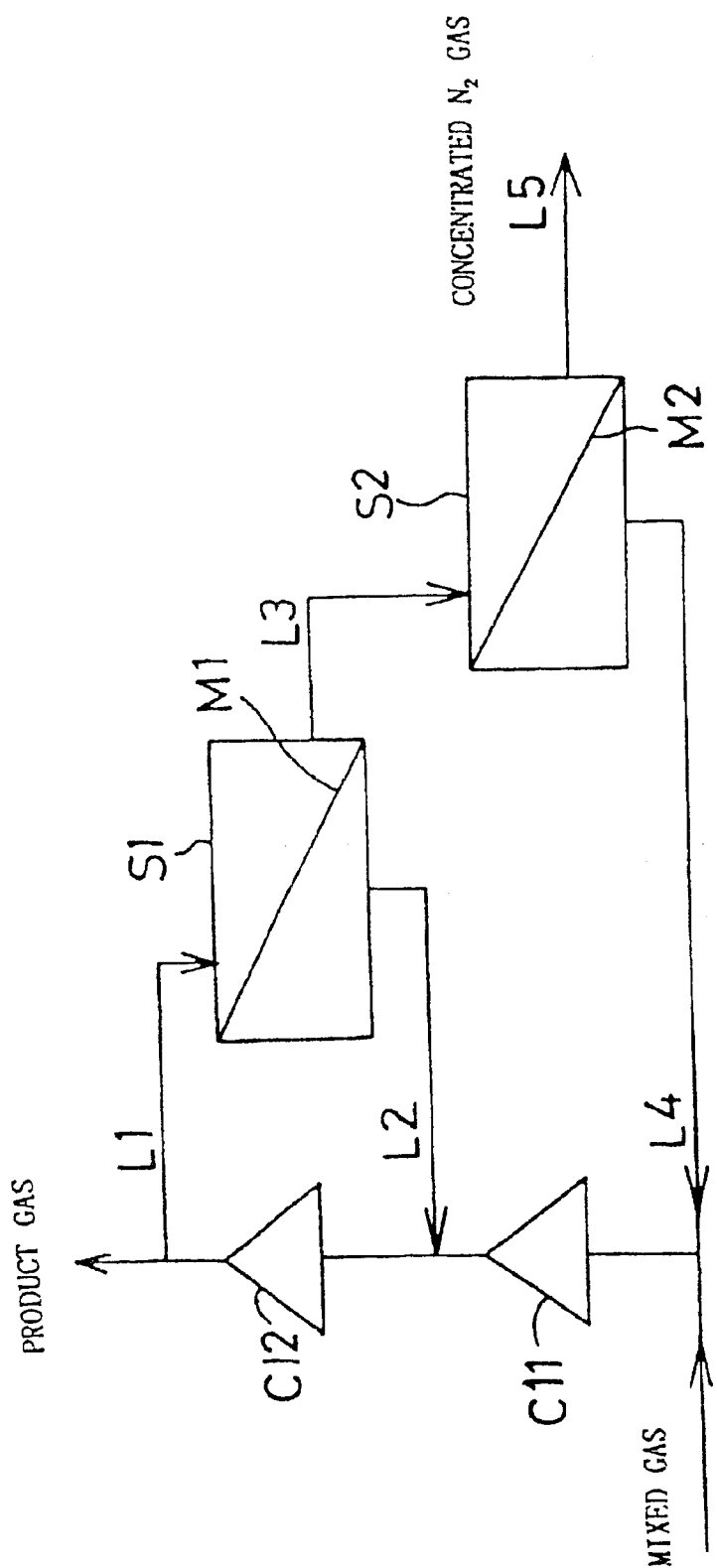
FIG. 1 is a schematic block diagram showing one example of the mixed gas concentration regulating apparatus according to the present invention.
Figure 2:
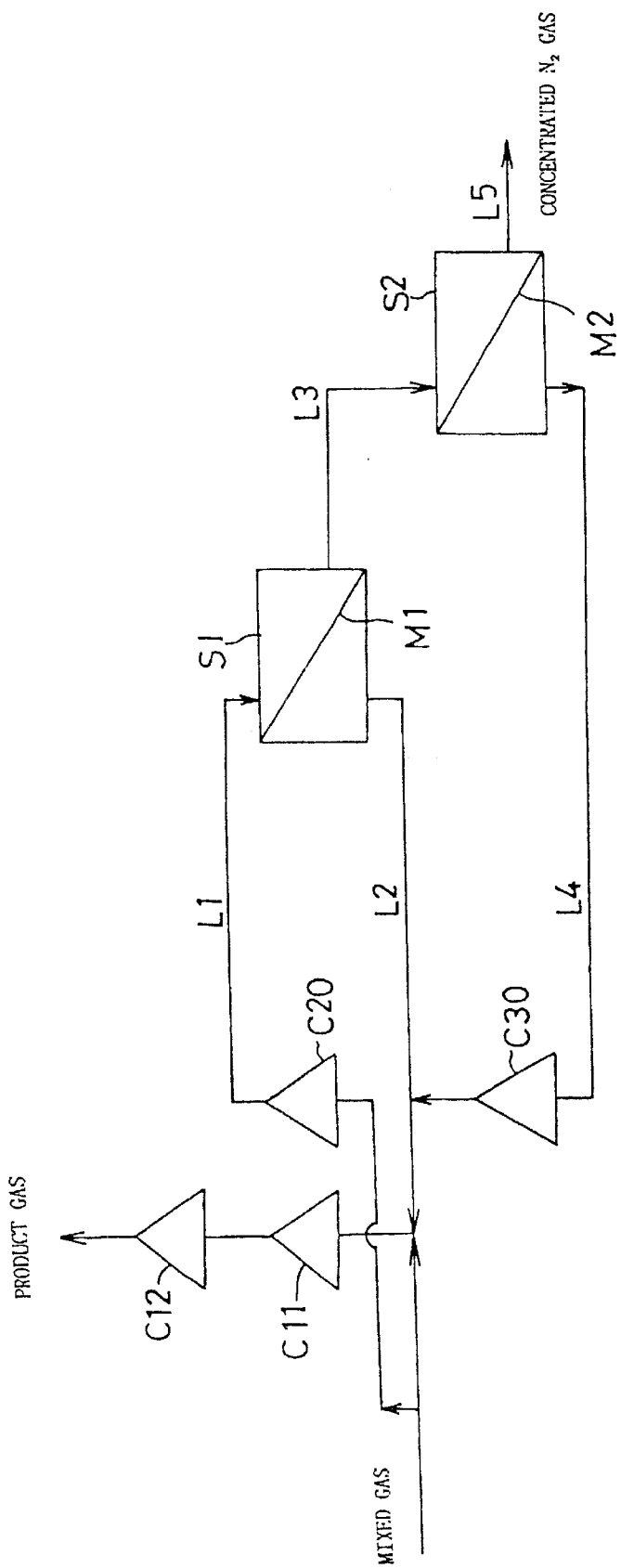
FIG. 2 is a schematic block diagram showing one example of the mixed gas concentration regulating apparatus of another embodiment.
Figure 3:
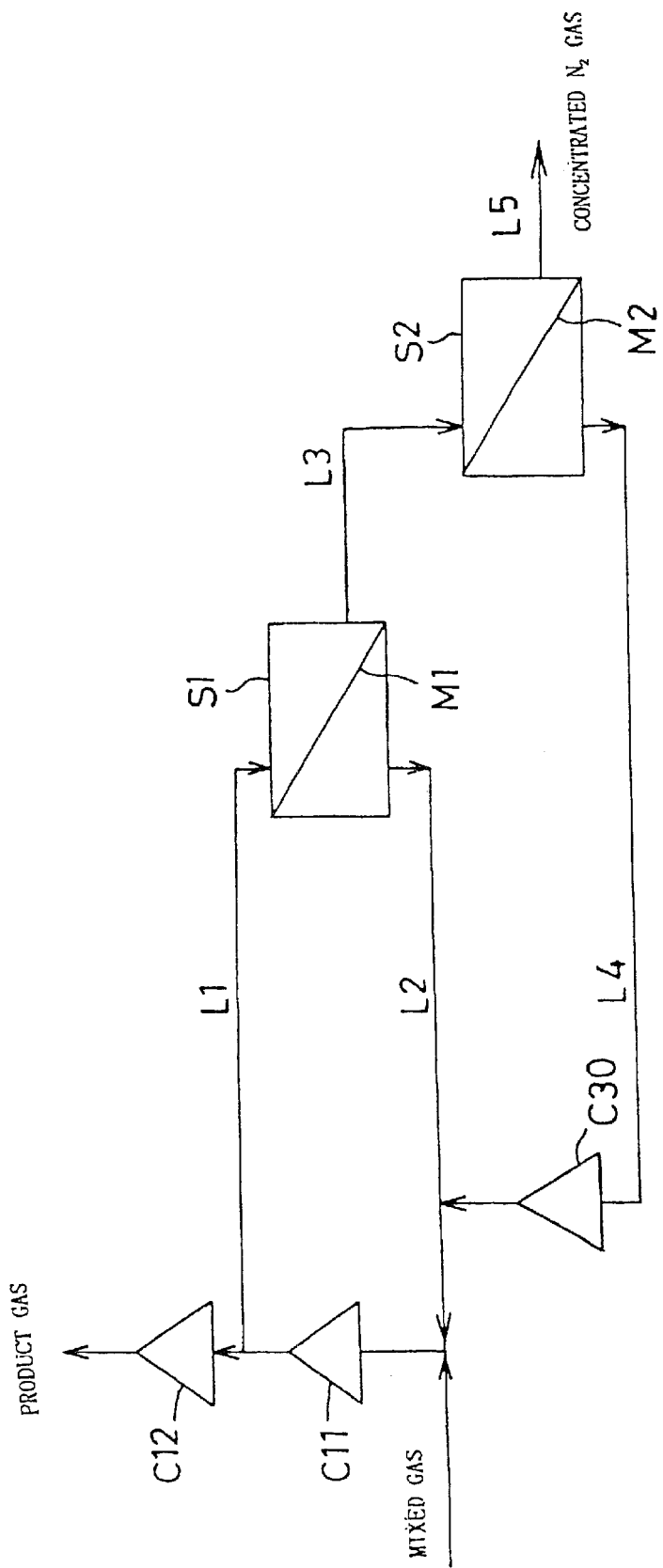
FIG. 3 is a schematic block diagram showing one example of the mixed gas concentration regulating apparatus of a further embodiment.
Figure 4:
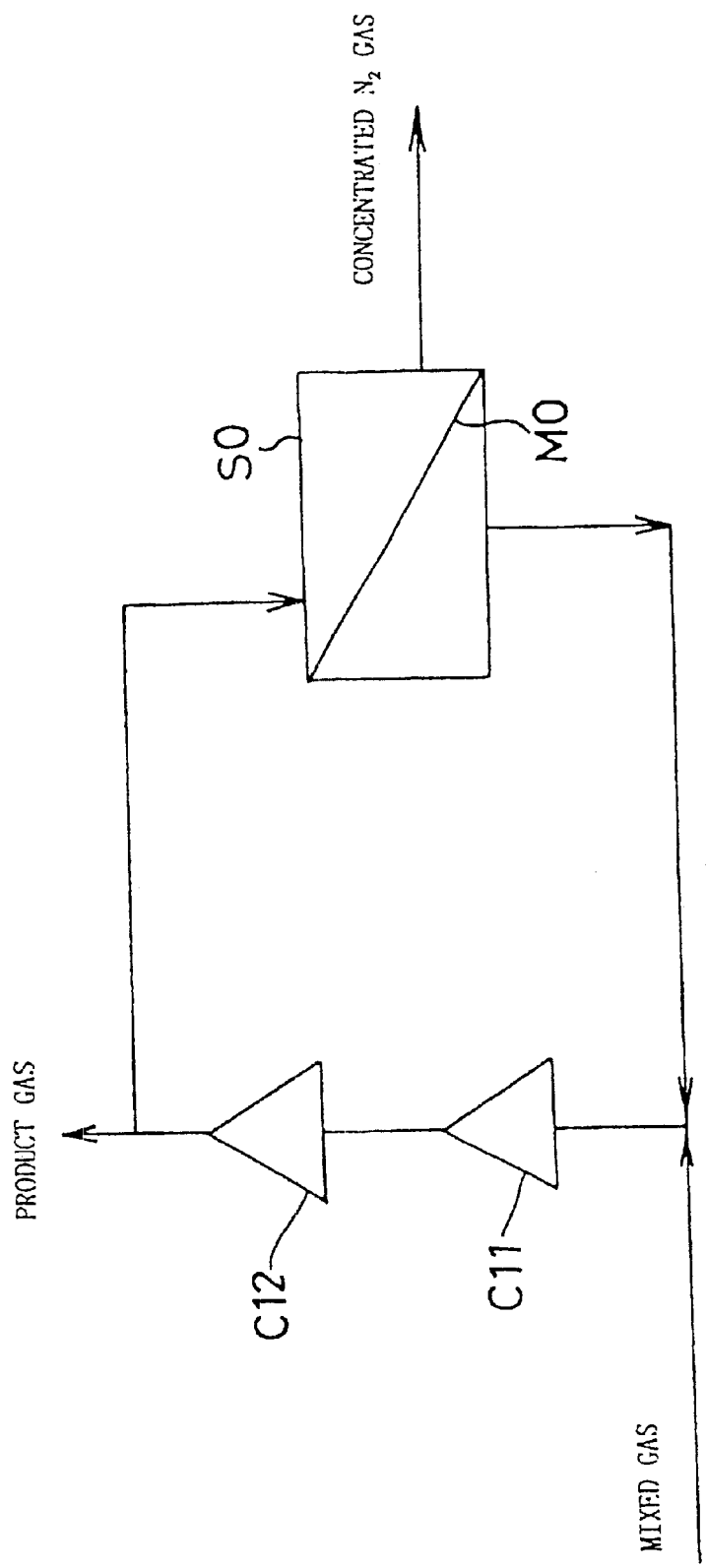
FIG. 4 is a schematic block diagram showing one example of the mixed gas concentration regulating apparatus (the conventional method 1) of the prior art.
Figure 5:
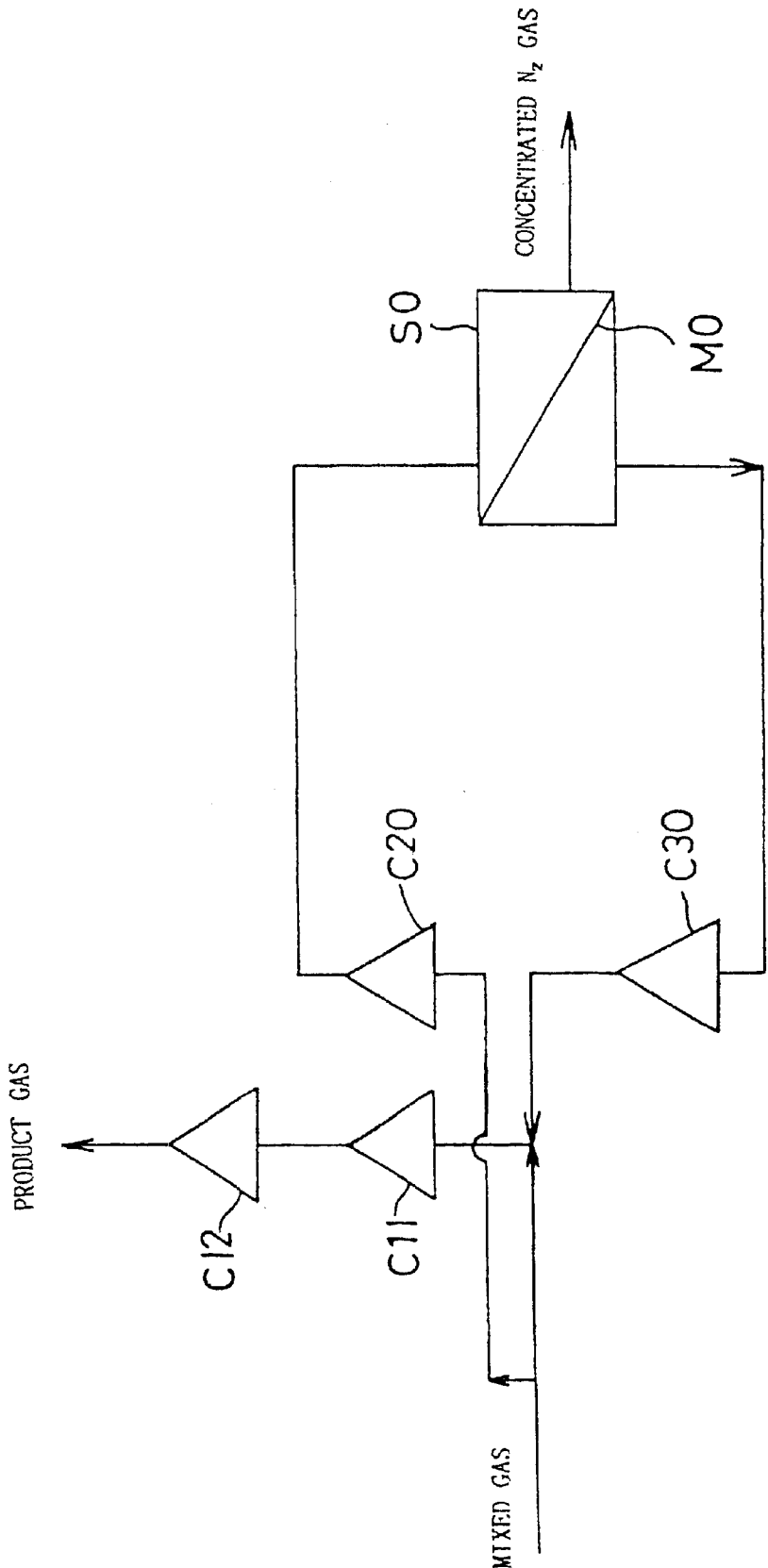
FIG. 5 is a schematic block diagram showing one example of the mixed gas concentration regulating apparatus (the conventional method 2) of the prior art.

S1~S2—gas separation sections, M1~M2—gas separation membranes, C11~30—boosters, L1~5—lines.

What is claimed is:

1. A mixed gas concentration method comprising the sequential steps of:

circulating a mixed gas in a main line;

diverting from the main line a part of the mixed gas;

supplying the diverted part to a first gas separating membrane to obtain a first permeate gas and a first retentate gas;

returning the first permeate gas to the main line;

passing the first retentate gas to a second gas separation membrane to obtain a second permeate gas and a second retentate gas; and returning the second permeate gas to the main line.

2. The method of claim 1, wherein the pressure ratio between feed side and permeation side of each of said separation membranes is maintained greater in the second separation membrane than in the first separation membrane.

3. The method of claim 2, wherein the second permeate gas is boosted before joining the main line.

4. The method of claim 2, wherein the diverted part is boosted before entering the first separation membrane.

5. The method of claim 2, wherein the mixed gas is boosted in the main line between the point where the second permeate gas is returned and the point where the part is diverted.

6. The method of claim 1, wherein the mixed gas is boosted in the main line after the point where the part is diverted.

7. The method of claim 1, wherein the mixed gas is a mixture of hydrogen and nitrogen.

8. The method of claim 7, wherein the mole ratio of nitrogen/hydrogen is regulated so as to exceed $\frac{1}{3}$.

* * * * *